(12) United States Patent
Miller

(10) Patent No.: US 6,243,985 B1
(45) Date of Patent: Jun. 12, 2001

(54) AUTOMATIC WATERING SYSTEM

(76) Inventor: Julius Miller, 334 Plaza Estival, San Clemente, CA (US) 92672

( * ) Notice: Subject to any disclaimer, the term of this patent is extended or adjusted under 35 U.S.C. 154(b) by 0 days.

(21) Appl. No.: 09/289,767

(22) Filed: Apr. 8, 1999

(51) Int. Cl.[7] .......................... A01G 31/06; A01G 27/00
(52) U.S. Cl. .................. 47/39; 47/62 R; 47/82; 47/83
(58) Field of Search .................. 47/39, 40, 79, 47/82, 83, 59, 62 R, 62 C, 62 E, 62 N, 63

(56) References Cited

U.S. PATENT DOCUMENTS

| | | | |
|---|---|---|---|
| D. 237,898 | * 12/1975 | Austin et al. | D11/144 |
| D. 309,652 | 7/1990 | Chalberg et al. . | |
| 2,585,698 | 2/1952 | Spring . | |
| 2,917,867 | * 12/1959 | Bailey | 47/16 |
| 3,841,023 | * 10/1974 | Carlyon | 47/38 |
| 3,842,534 | 10/1974 | Walters et al. . | |
| 4,170,844 | * 10/1979 | Steele | 47/62 |
| 4,248,013 | * 2/1981 | Allen | 47/59 |
| 4,255,898 | 3/1981 | Greenbaum . | |
| 4,603,506 | * 8/1986 | Powell, Jr. | 47/62 |
| 4,828,894 | 5/1989 | Taylor . | |
| 4,982,527 | 1/1991 | Sprung . | |
| 5,044,118 | * 9/1991 | Ferris | 47/62 |
| 5,095,649 | * 3/1992 | Brownlee | 47/41.01 |
| 5,409,510 | 4/1995 | Houweling . | |
| 5,484,234 | * 1/1996 | Worden | 405/284 |
| 5,673,511 | 10/1997 | Holtkamp . | |
| 5,685,488 | * 11/1997 | Gwartney | 239/279 |
| 5,826,375 | * 10/1998 | Black | 47/67 |
| 5,852,895 | * 12/1998 | Sinanan | 47/33 |
| 5,987,812 | * 11/1999 | Knell | 47/39 |

FOREIGN PATENT DOCUMENTS

| | | |
|---|---|---|
| 297544 | 1/1992 | (DE) . |
| 445320 | 9/1991 | (EP) . |
| 2382850 | * 11/1978 | (FR) . |
| 2461449 | * 3/1981 | (FR) . |
| 2554315 | * 5/1985 | (FR) . |
| 2761575 | * 10/1998 | (FR) . |
| 439424 | * 12/1935 | (GB) . |

* cited by examiner

Primary Examiner—Peter M. Poon
Assistant Examiner—Son T. Nguyen
(74) Attorney, Agent, or Firm—Gene Scott-Patent Law & Venture Group

(57) ABSTRACT

A customizable potted plant watering apparatus is made up of a variety of interconnecting parts to form one or more separate elongate trays which are arrange in any fashion but generally one above the next. Each linear or radial tray section is adapted for supporting one or more potted plants. Trays are interconnected by flexible tubes so that when water is introduced into an upper tray it flows downwardly into subsequent lower trays. Trays are inexpensively fabricated by an extrusion process and when attached at both ends to end sections, form a finished shelf into which water may be introduced so as to hydrate and feed the plants by root absorption. The end sections are held in place by a snap on cover which also engages a screen to provide an effective watering tray and a clog free system.

4 Claims, 4 Drawing Sheets

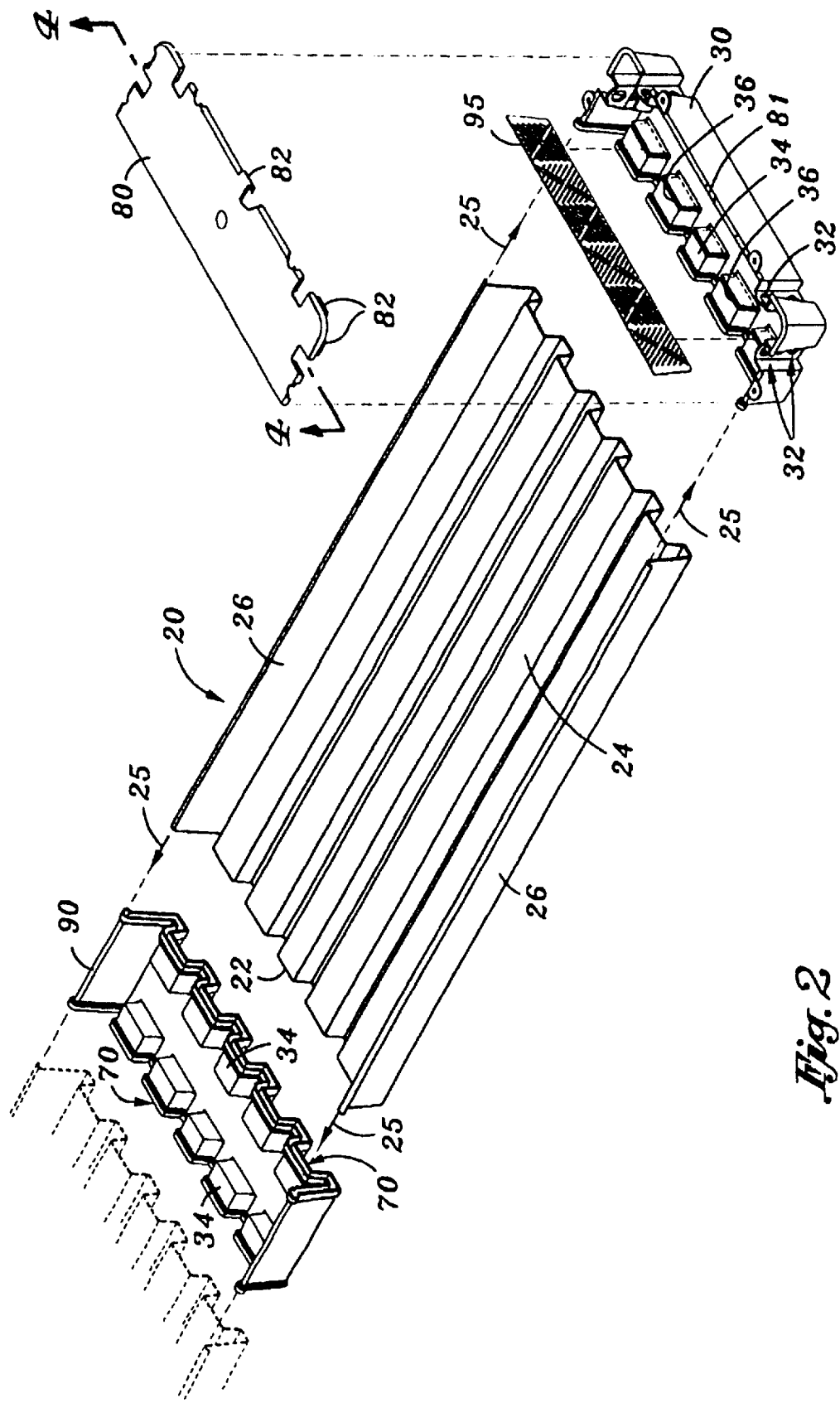

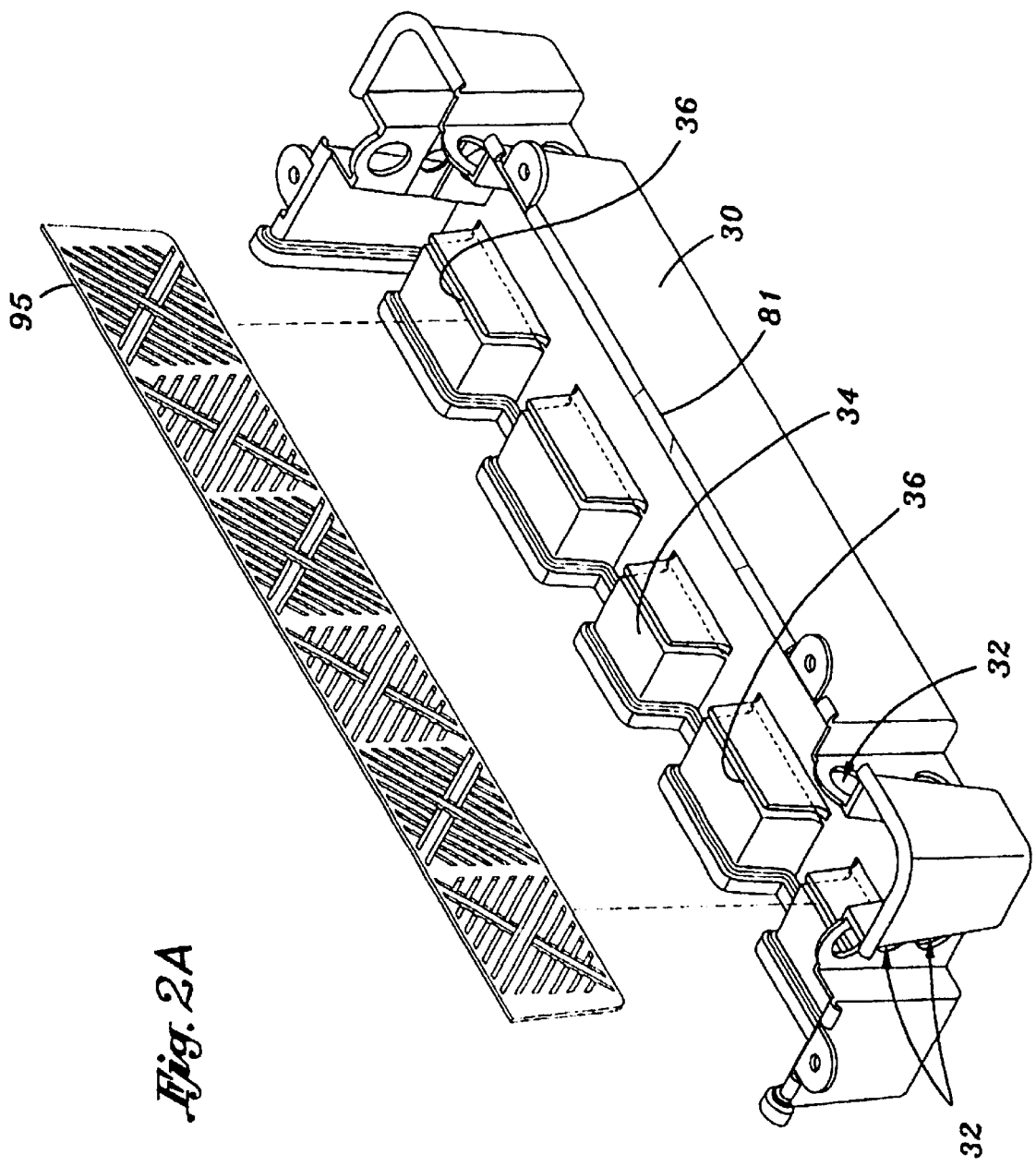

AUTOMATIC WATERING SYSTEM

BACKGROUND OF THE INVENTION

FIELD OF THE INVENTION

This invention relates generally to plant watering systems, and more particularly to such a system that may be custom configured for watering potted plants through root absorption and adapted for multi-level tray placement.

Chalberg et al., U.S. D309,652 describes a dispenser for lawn care chemical or the like.

Spring, U.S. Pat. No. 2,585,698 describes a battery brooder having a plurality of vertically spaced coop sections, a trough adjacent each section, a vertical inlet pipe, means connecting the inlet pipe to a source of water, water inlet tubes leading from said inlet pipe to said troughs, a vertical outlet pipe, outlet tubes leading from bottom portions of said troughs to said outlet pipe and means operatively connected to said outlet pipe to raise and lower said outlet pipe so that the troughs may be filled when the outlet pip is raised and drained when the outlet pipe is lowered.

Walters et al., U.S. Pat. No. 3,842,534 describes stable trays adapted for the growth of mushrooms and being resistant to deterioration under the conditions of such use, comprising side walls, end walls, base members and legs formed of extruded aluminum and assembled in such manner as to provide stackable trays which are durable, corrosion-resistant, impervious to organic growth, light in weight, have low thermal expansion and high heat transfer and provide better air circulation than prior known trays for this purpose.

Greenbaum, U.S. Pat. No. 4,255,898 describes a channel culture device for plant systems which comprises a plurality of longitudinal growing channels, for growing the primary plants, and service channels, which aid the growing channels. The channels alternate and fluids, water and air, pass laterally between the growing and service channels which enhance plant growth.

Taylor, U.S. Pat. No. 4,828,894 describes assemblies of sheets of corrugated plastic board and molded plastic interlock elements providing useful products each as container. Sheets of corrugated plastic board are interlocked with one another by means of molded plastic connector pieces or strips having receptor slots containing spaced lock ramps. The slots receive a uniform edge of a sheet of corrugated plastic which is provided with spaced slits aligned with the connector slot cases the spaced lock ramps to compress the edge until the aligned slits pass there over, and the "memory" of the corrugated plastic board causes the edge portion thereof, beyond the slit, to spring back to its original thickness and thereby lock the edge of the plastic board within the slot of the molded plastic connector. Sprung, U.S. Pat. No. 4,982,527 describes a new and useful propagation assembly consisting of at least one propagation tray comprising a lower plant support section including at least one longitudinal channel for nutrient solution flow; and an upper space section having a series of spaced opening positioned longitudinally above each at least channel.

Houweling, U.S. Pat. No. 5,409,510 describes a watering gutter for use in a flood irrigation system is an elongate channel with spaced side walls and two container supporting surfaces running along the bag. The container supporting surfaces are separated by a drainage trough. Two additional drainage troughs are located between the sidewalls and the container support surfaces. In use, the gutters are arranged side by side, but spaced apart to provide adequate air movement around the plants. The troughs in the base of each gutter ensure uniform water distribution to plants and full drainage of the water away from the plant containers.

Holtkamp, Jr., U.S. Pat. No. 5,673,511 describes a self-watering tray for supporting and displaying a plurality of potted plants which can be watered from a water reservoir in the bottom of the tray, the tray comprising a plurality of wall sections which define spaced openings in the tray, each wall section being provided with a support located above the reservoir for supporting the potted plant at or above the water, and being laterally open to the adjacent wall section below the supports to provide a continuous reservoir channel below the supports and pots, through which water can circulate for watering plants by capillary action.

Jagodzinsky, EP 445320A describes a hydroponics container having a support leg at each corner, protruding downwards to allow vertical stacking. In the body of each container is a liquid overflow system, with inlet above the level of the bottom. Its outlet is below the bottom, but above the level of the bottom ends of the legs. The level of the inlet is pref. Adjustable with regard to the container bottom.

Langer, DD 297544-A5 describes an open topped container filed with a plant raising medium that is a threaded connection to which a water supply line is connected. Inside the bottom of the container is a tube extending from end to end, and with perforations through its wall for discharging water at a controlled rate. Containers can be connected in series, with flexible water supply pipes between them. The whole system can be connected to a supply unit for regulating the flow.

The prior art teaches plant watering systems of many kinds. However, the prior art does not teach that such a system can be adapted for watering and feeding plants by providing a tray system of interconnected trays or shelves having a water conducting capability for watering plants in a sequential manner with water flowing from a higher level to a lower level. The present invention fulfills these needs and provides further related advantages as described in the following summary.

SUMMARY OF THE INVENTION

The present invention teaches certain benefits in construction and use which give rise to the objectives described below.

The present invention provides a customizable potted plant watering apparatus made up of a variety of interconnecting parts to form one or more separate elongate trays which are arranged in any fashion but generally one above the next. Each linear or radial tray section is adapted for supporting one or more potted plants. Trays are interconnected by flexible tubes so that when water is introduced into an upper tray it flows downwardly into subsequent lower trays. Trays are inexpensively fabricated by an extrusion process and when attached at both ends to end sections, form a finished shelf into which water may be introduced so as to hydrate and feed the plants by root absorption. The end sections provide a snap on cover which also engages a screen to provide an effective watering tray and a clog free system.

A primary objective of the present invention is to provide a plant watering system having advantages not taught by the prior art.

Another objective is to provide such a system that is enabled to be custom assembled in any configuration necessary to meet particular needs of individuals and nursery managers.

A further objective is to provide such a system providing a novel interconnection approach to making-up custom plant trays.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is an exploded perspective view thereof showing individually: a tray portion, tray connector piece; a tray end piece and a tray end piece cover in relative positions;

FIG. 2A is an exploded perspective view of an end tray portion thereof;

DETAILED DESCRIPTION OF THE INVENTION

Figure 1:
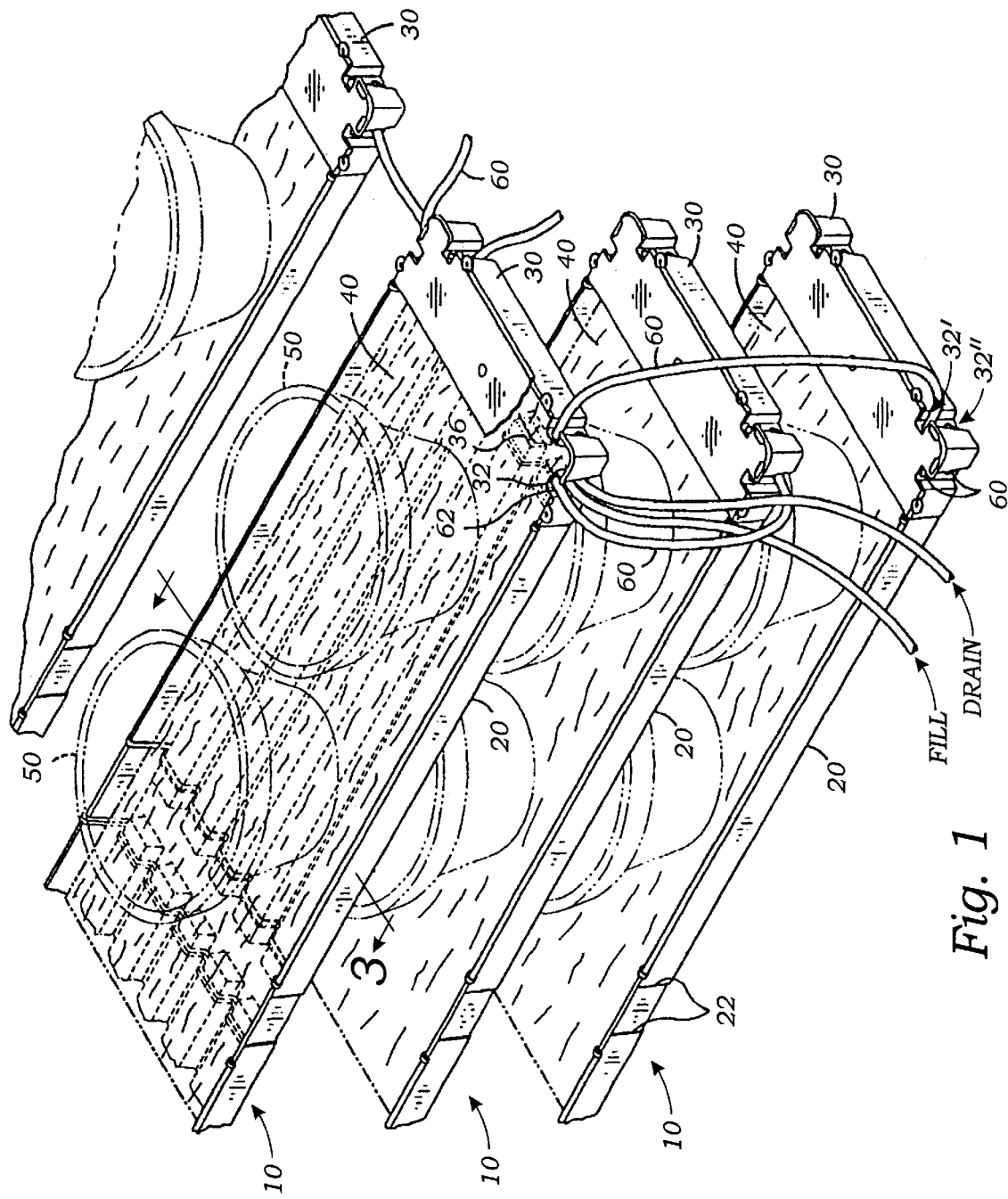
FIG. 1 is a perspective view of the preferred embodiment of the present invention.
Figure 3:
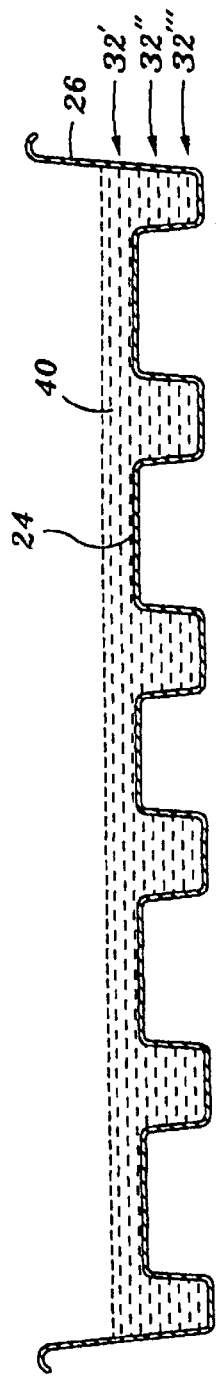
FIG. 3 is a sectional view thereof taken along line 3—3 in FIG. 1.
Figure 4A:
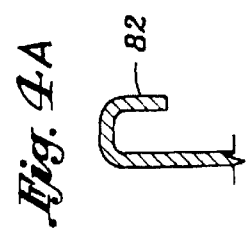
FIG. 4A is a sectional view taken along line 4A—4A in FIG. 4.
Figure 5:
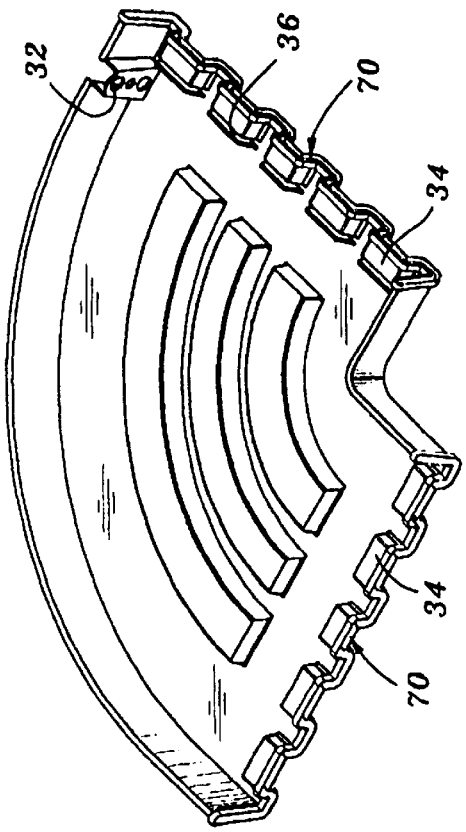
FIG. 5 is a right angle connector piece thereof.
Figure 4:
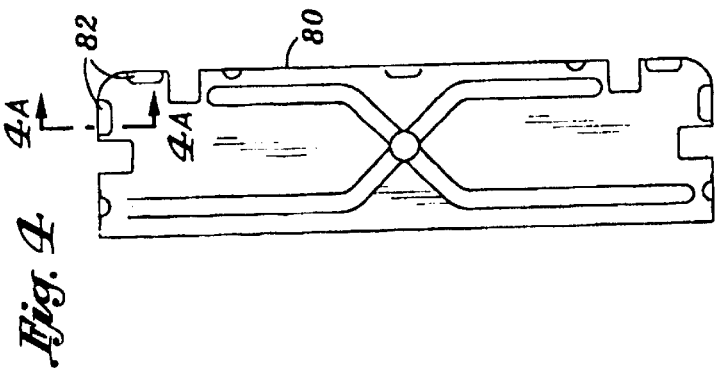
FIG. 4 is a bottom plan view of the tray end piece cover as seen from line 4—4 in FIG. 2.

The above described drawing figures illustrate the invention, an apparatus system comprising a plurality of elongate tray means 10 each of which may be straight as shown in FIG. 2, or curved, and generally have a low profile conformation. Each of the elongate tray means 10 further comprises, a medial tray portion 20 permanently joined, preferably by bonding at each end 22 by insertion into a slot means 70 of end tray portion 30 or right-angle extension joint piece 100 (FIG. 5) so as to capture and support a liquid 40 in the elongate tray means 10. A plurality of elongate tray means 10 are preferably positioned at selected heights, one above the next or side by side, as shown in FIG. 1, and spaced so as to enable placement of potted plants 50 (not part of the instant invention) between the tray means 10 as shown. The plants 50 rest on the tray means 10. The present invention further comprises a water conducting means 60, comprising lengths of flexible tubing placed for joining pairs of the elongate tray means 10 through frictional engagement of terminal ends 62 of the water conducting means 60 in apertures 32 in the end tray portions 30. Alternately, the conducting means may be fastened to the apertures 32 by common connectors, or by other means well known in the art. The apertures 32, are placed at a first level 32' for purging water overflow from the tray means 10, at a second level 32", below level 32' for receiving water input into the tray means for filling it and also at a third level 32"' below level 32" for draining the tray means 10. Those lengths of conducting means 60 which are used for drainage may be valved-off until needed, thereby enabling water to flow from a given tray means 10 to a lower tray means 10 only after the given tray means 10 has filled to the level 32' as shown in FIG. 3 sufficient for effective watering of potted plants. Inventively, the medial tray portions 20 each provide a supporting floor 24 of corrugated or otherwise convoluted sheet material (see FIG. 3), which is preferably extruded, and a pair of laterally spaced side walls 26 for containing the liquid 40 within the tray portions 20. The end tray portions 30 each are, as previously stated, adapted through the provision of an slot means 70 corresponding in shape to the medial tray portion 20 for accepting one end 22 of one of the medial tray portions 20 and for sealing the medial tray portion 20 such that one of the medial tray portions 20 and two of the end tray portions 30 function to support the liquid 40 therewithin, as shown best in FIG. 3, in a liquid-tight enablement as further described below.

Each one end 22 of each of the medial tray portions 20 is received within one of the slot means 70 of the end tray portions 30 for sandwiching a sealing strip therebetween and further, an end tray portion cover 80 is adapted for snap-engagement over one of the end tray portions 30 so as to rigidize the end tray portion 30. As shown in the sectional view 4A, the cover 80 provides a series of peripheral tabs 82 engagable with an edge flange 81 of the end tray portion 30 as is best shown in FIG. 1. Other means for snap-attachment of these two parts is well within the means of those of skill in the art. It should be understood that the medial tray portions 20 are engaged into the end tray portion 30 by sliding the one end 22 of the medial tray portion 20 into the slot means 70 of the end tray portion 30 along arrows 25 shown in FIG. 2.

The present invention further comprises a liner extension joint piece 90 adapted for joining in the manner described above, of two of the medial tray portions 20, one at either end thereof, for colinear extension of the elongate tray means 10. The extension joint piece 90 functions for liquid-tight engagement with the end 22 of the medial tray portion 20 in an identical manner as with the connections for the end tray portions 30 previously described.

The present invention further comprises a screening means 95 adapted by its size and shape for being engaged within the end tray portion 30 by friction, in slots 36 adjacent to bosses 34, and for being secured by one of the end tray portion covers 80. Such screening means 95 is preferably used and usually necessary so as to prevent debris from the potted plants 50 from entering the water conducting means 60 where it would cause clogs.

The present invention further comprises a right-angle extension joint piece 100 adapted for joining, in the manner described above, of two of the medial tray portions 20 for right-angle extension of the elongate tray means 10. Other combinations of the above elements may be interchanged and assembled in a large number of combinations to fit the space limitation needs of end users of the system. These components are preferably made of a hard molded plastic material by injection or extrusion processes. Typical materials that may be used are polyethylene, polypropylene, polystyrene, polyvinyl Chloride.

In use, the present invention system is constructed by assembly of selected numbers of the above described parts so as to provide a multi-level potted plant watering system. A support rack with shelves or the like (not shown) is used to support the invention so as to assure adequate support for what may be a considerable weight of the potted plants. However, one of the advantages of the present invention is that the parts provide support watering surfaces which are made from an extrusion and provide considerable strength due to the corrugated shape. Such corrugations also account for the ability of the supporting elements 20 and 100 to resist twisting forces. Such forces are also clearly resisted by the end tray portion covers 80 and screening means 95 which provide considerable rigidizing to the assembly.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An automatic watering apparatus comprising a plurality of elongate trays, each one of said elongate trays further comprising:
   - a medial tray portion permanently joined at each end thereof by an end tray portion so as to support a. liquid in the elongate tray;
   - at least two of the plurality of elongate trays positioned at selected heights, one above the next and spaced so as to enable placement of plants therebetween, the plants resting on the trays;
   - a water conducting means joining pairs of the elongate trays through frictional engagement of terminal ends of said water conducting means in apertures in the end tray portions thereof;
   - the medial tray portions providing a supporting floor of corrugated sheet material and further providing a pair of laterally spaced side walls for containing the liquid;
   - the end tray portions each adapted by a slot means for accepting an end of one of the medial tray portions and further adapted for sealing the medial tray portion therewith such that one of the medial tray portions and two of the end tray portions support the liquid therewithin in liquid-tight enablement; and
   - a pair of end tray portion covers for each of the medial trays with end tray portions, each of the covers adapted for snap-engagement over one of the end tray portions so as to rigidize the end tray portion.

2. The apparatus of claim 1 further comprising a linear extension joint piece adapted for joining two of the medial tray portions for colinear extension of the elongate trays.

3. The apparatus of claim 1 further comprising a right-angle extension joint piece adapted for joining two of the medial tray portions for right-angle extension of the elongate trays.

4. The apparatus of claim 1 further comprising a screening means adapted for being engaged within at least one end tray portion and for being secured by an end tray portion cover.

\* \* \* \* \*